Oct. 25, 1955   A. D. GOODWIN   2,721,656
LEAF SEPARATOR
Filed Sept. 20, 1954   2 Sheets-Sheet 2

INVENTOR
Alfred D. Goodwin
BY Webster & Webster
ATTYS.

United States Patent Office 2,721,656
Patented Oct. 25, 1955

2,721,656

LEAF SEPARATOR

Alfred D. Goodwin, Manteca, Calif., assignor to A. D. Goodwin & Son, Manteca, Calif., a partnership Application September 20, 1954, Serial No. 456,959

6 Claims. (Cl. 209—36)

This invention relates to agricultural machinery or apparatus; a major object of the invention being to provide a machine—usable in connection with the harvesting of certain crops, such as nuts, prunes, or the like—by means of which dirt, leaves, and other foreign matter which may be picked up from the ground during the harvesting operation, will be removed or separated from the nuts, etc., and the latter will be delivered from the machine in a properly cleaned condition.

The machine includes a conveyor which initially carries the produce and leaves mixed therewith; such leaves being sometimes in bunches or damp matted-together clumps. A blower is provided to separate the leaves from the produce at a certain point in their movement along the conveyor, and a further object of the invention is to provide means, acting in conjunction with the blower, to break up any such bunches or clumps of leaves and throw the same into the air stream delivered by the blower. In this manner the leaves, which are relatively light individually, are discharged from the machine, without the air blast having to be of such force as might cause the heavier produce itself to be carried away by the blast.

Still another object of the invention is to produce a leaf separator which is designed for ease and economy of manufacture.

It is also an object of the invention to produce a practical, reliable, and durable leaf separator, and one which will be exceedingly effective for the purpose for which it is designed.

These objects are accomplished by means of such structure and relative arrangement of parts as will fully appear by a perusal of the following specification and claims.

In the drawings:

Fig. 5 is a similar view on line 5—5 of Fig. 1.

Figure 1:
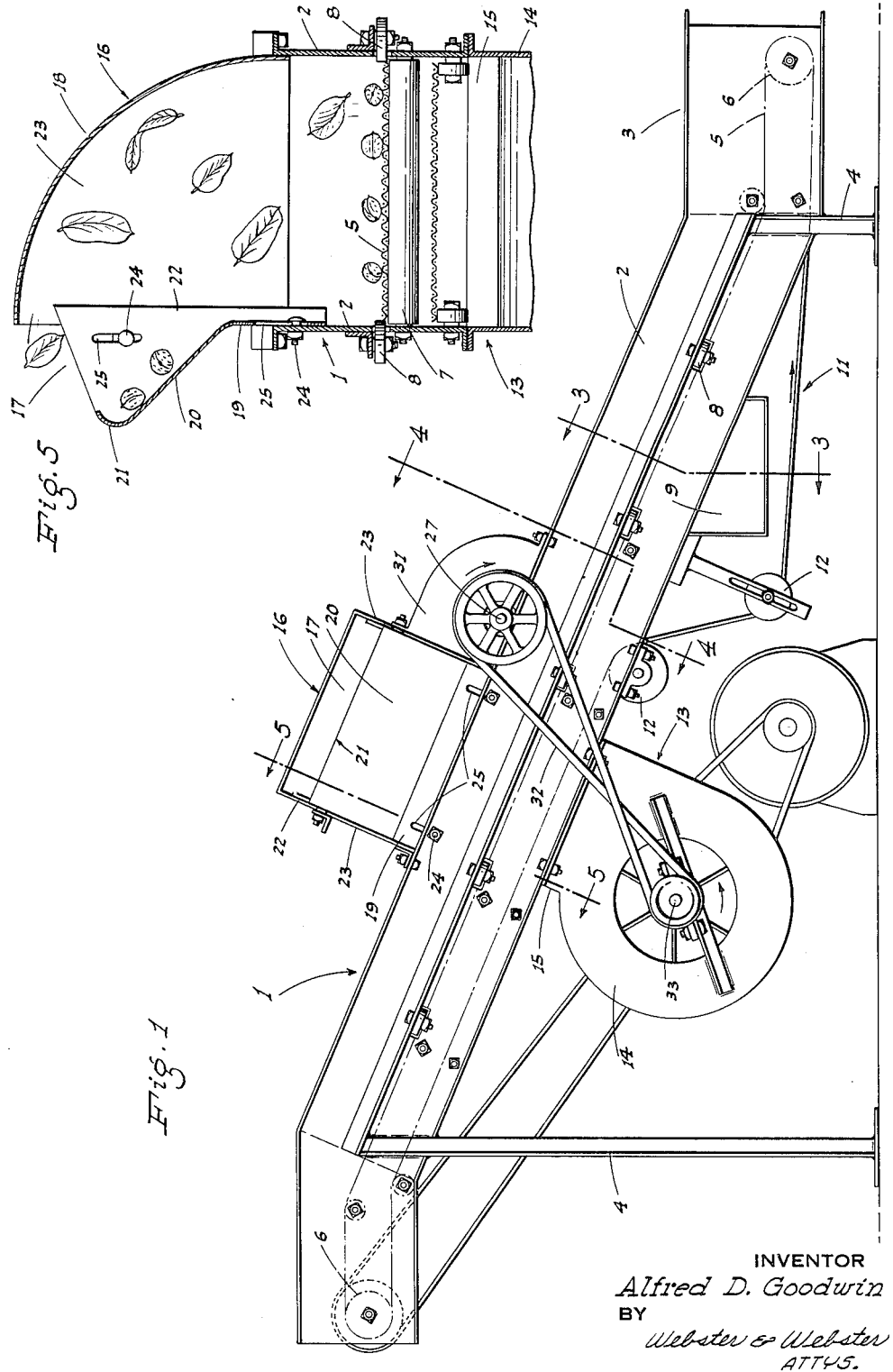
Fig. 1 is a side elevation of my improved leaf separator.

Referring now more particularly to the drawings, and to the characters of reference marked thereon, the separator comprises an elongated conveyor, indicated generally at 1, and including spaced, relatively deep side frames 2.

The conveyor is set at an upward slope from its intake end 3 to its discharge end, and while the separator is here being shown as a stationary structure, supported by depending legs 4, the separator is preferably intended and designed for mounting on a traveling harvester such as that shown in my Patent No. 2,508,454, dated May 13, 1950. When so mounted, the harvested material is delivered to the intake end 3 of the conveyor by the pick-up mechanism of the harvester.

Mounted between the side frames is an endless conveyor belt 5. This is a metal screen-like member, preferably of the "cyclone type."

The conveyor belt passes about supporting rollers 6 at the ends of the frames 2; the upper roller being driven by suitable means and in a direction such that the upper run of the conveyor belt moves upwardly. The upper belt run is also supported at intervals in its length by rollers 7 and guided at its sides by other rollers 8.

At a point on the conveyor a short distance from the intake end thereof, a transverse laterally discharging chute 9 is mounted on frames 2 to receive dirt, etc., dropping through from the upper run of the belt; a solid plate 10 underlying said upper run from the chute to the intake end of the conveyor. In order to miss the chute, the lower run of the belt is deflected downwardly, as shown at 11; being guided by suitably disposed rollers 12.

A short distance above the chute and the downwardly deflected portion 11 of the lower belt run, a blower 13 of conventional character is mounted on frames 2 in depending relation thereto; the blower including a housing 14 having its discharge opening 15 facing upwardly directly under and adjacent the conveyor belt and extending the full width between the side frames 2, as shown in Fig. 5.

Directly in line with the discharge opening 15, and projecting upwardly from the frames 2, is a leaf discharge conduit 16 having a laterally and upwardly facing discharge opening 17 at one side of the conveyor. The back wall 18 of the conduit curves upwardly from the other side of the conveyor frame to the top of said opening 17, while a gate 19 projects upwardly from said one side of the conveyor.

The gate, a short distance above the frame 2, slopes outwardly, as at 20, and terminates in an overhanging lip 21 which is on a level some distance below the upper end of wall 18, as shown in Fig. 5; the distance between the lip and the upper end of said wall determining the actual size of the outlet opening 17.

The gate includes wings 22 extending from top to bottom thereof and lapping the corresponding side walls 23 of the conduit 16 on the inside. The gate is mounted on the conveyor, and on the conduit, for vertical adjustment relative thereto, so as to alter the level of the lip 21 and the size of the discharge opening 17, by suitable means, such as clamping bolts 24, engaged in vertical slots 25 in the gate walls, as shown in Fig. 5.

Figure 2:
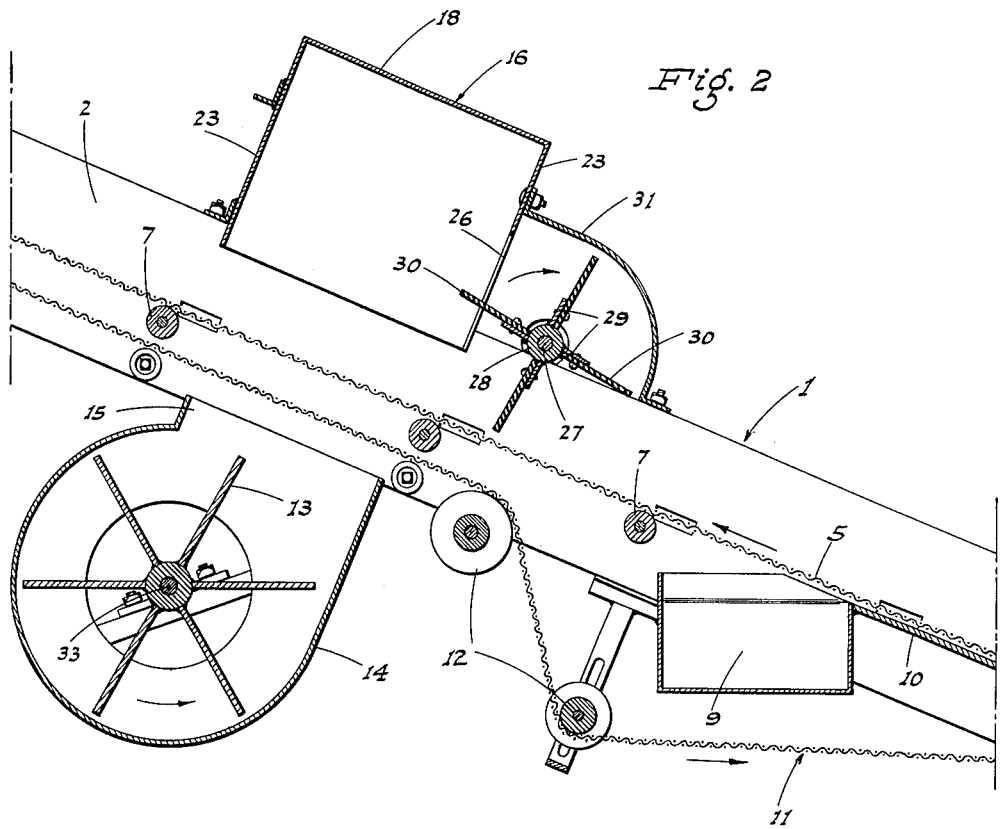
Fig. 2 is a fragmentary enlarged longitudinal section of the separator.
Figure 4:
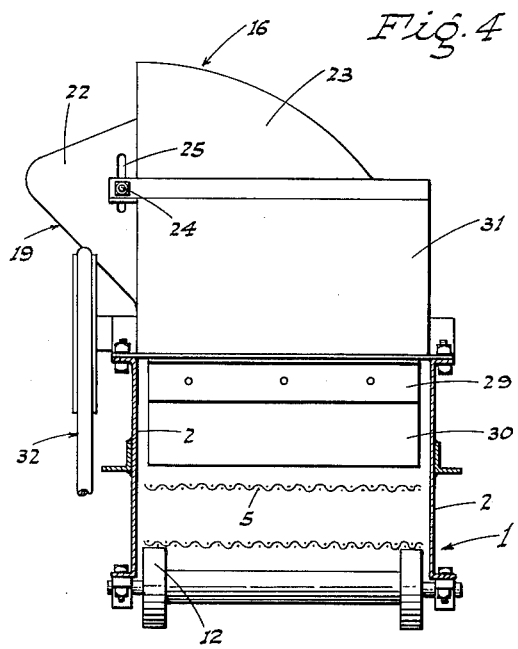
Fig. 4 is a similar view on line 4—4 of Fig. 1.
Figure 3:
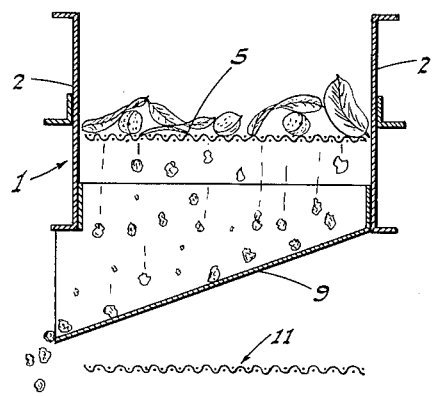
Fig. 3 is an enlarged cross section on line 3—3 of Fig. 1.

The wall 33 which faces the lower intake end of the conveyor is formed with a full-width opening. Mounted on the top of frames 2 in front of said opening is a cross shaft 27 on which is mounted a roller 28 having radial flanges 29. Resilient, full-width paddles or vanes 30 are secured on the flanges and are of a radial extent sufficient to approach the upper run of the conveyor belt 5 in sweeping relation thereto and to project through the opening 26 and into the conduit 16 a short distance, as shown in Fig. 2. The upper portion of this rotary vane unit, above the frames 2, is enclosed in a housing 31 which extends to the adjacent wall of the conduit 16.

The shaft 27 is driven, so that the descending vanes move in the direction of the upper discharge end of the conveyor, by suitable means such as a belt connection 32 with the blower shaft 33, as shown in Fig. 1.

As a result of the above described arrangement of parts, nuts and all foreign matter which may have been picked up therewith as fed onto the intake end of the conveyor are carried by the belt 5; dirt and the like mixed therewith dropping through the belt as the latter passes over the chute 9 and drops into the same.

The nuts which are too large to drop through the belt, together with leaves, twigs and the like which also are too large to drop therethrough, are carried along until all reach the zone of action of the paddle unit. The paddles engage and sweep the nuts and leaves ahead and upwardly; breaking up any leaf bunches or clumps, and throwing them into the path of the upwardly directed blast of air from the blower for effective discharge through opening 17.

The nuts—being relatively heavy—tend to remain on, or drop quickly back to, the conveyor, but should any thereof be thrown up into the air conduit 16 and tend to be discharged therefrom by reason of the laterally directed air blast, they are caught in the pocket formed by the lip 21 and then slide back down on the sloping gate wall 20 and drop onto the conveyor.

Adjustment of the gate, an operation which may be quickly effected, enables the size of opening 17, and the position of the lip 21, to be altered to give the most advantageous separating action when processing different types and sizes of nuts or other produce being harvested and treated.

From the foregoing description it will be readily seen that there has been provided such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A device for separating leaves from nuts and like products as harvested comprising a longitudinal conveyor structure having intake and discharge ends and which includes spaced side frames and an endless screen-type conveyor belt mounted lengthwise in the structure with its upper run disposed between the frames and arranged to travel toward the discharge end of the structure; a blower mounted on the structure intermediate its ends and having an outlet positioned to direct an air blast upwardly between the side frames and through the conveyor belt, a conduit projecting upwardly from the frames in alinement with the blower outlet and terminating in a discharge opening on one side and at the top thereof, and a vertically adjustable gate included with the conduit at said one side thereof, the upper edge of the gate forming the lower edge of the outlet.

2. A structure, as in claim 1, in which said gate slopes laterally out to its upper end, and an inturned, downwardly curved lip extending along the upper edge of the gate and defining the lower edge of the outlet opening.

3. A device for separating leaves from nuts and like products as harvested comprising a longitudinal conveyor structure having intake and discharge ends and which includes spaced side frames and an endless screen-type conveyor belt mounted lengthwise in the structure with its upper run disposed between the frames and arranged to travel toward the discharge end of the structure; a blower mounted on the structure intermediate its ends and having an outlet positioned to direct an air blast upwardly between the side frame and through the conveyor belt, a conduit projecting upwardly from the frames in alinement with the blower outlet and terminating in a discharge opening on one side and at the top thereof, and a transversely disposed rotary paddle unit mounted on the frames adjacent and back of the conduit and arranged relative to the upper run of the conveyor belt and to the conduit so as to engage and sweep material on the belt upwardly and lengthwise of the belt into the conduit and into the path of the upwardly directed air blast.

4. A device for separating leaves from nuts and like products as harvested comprising a longitudinal conveyor structure having intake and discharge ends and which includes spaced side frames and an endless screen-type conveyor belt mounted lengthwise in the structure with its upper run disposed between the frames and arranged to travel toward the discharge end of the structure; a blower mounted on the structure intermediate its ends and having an outlet positioned to direct an air blast upwardly between the side frames and through the conveyor belt, and a conduit of substantially rectangular form in cross section projecting upwardly from the frames in alinement with the blower outlet, one wall of the conduit curving upwardly from one side frame to a termination above the other side frame and the opposite wall of the conduit extending upwardly from said other side frame to a termination below the termination of said one wall to provide a laterally discharging opening therebetween, and an inturned downwardly curved lip along the upper edge of said opposed wall.

5. A device for separating leaves from nuts and like products as harvested comprising a longitudinal conveyor structure having intake and discharge ends and which includes spaced side frames and an endless screen-type conveyor belt mounted lengthwise in the structure with its upper run disposed between the frames and arranged to travel toward the discharge end of the structure; a blower mounted on the structure intermediate its ends and having an outlet positioned to direct an air blast upwardly between the side frames and through the conveyor belt, a conduit projecting upwardly from the frames in alinement with the blower outlet and provided with an outlet opening, a carry-off chute mounted on the structure intermediate the blower and the intake end of the structure to receive foreign matter dropping through the upper run of the belt, and a solid plate directly under said upper run and extending from said chute to the intake end of the structure.

6. A structure, as in claim 3, in which said conduit is provided with an opening in the side wall thereof nearest the paddle unit and extending upwardly from the lower edge of said wall, the opening intersecting the path of rotation of the peripheral portion of the paddles; and a hood extending back from said wall and above the side frames and covering the portion of the paddle unit above said frames.

References Cited in the file of this patent

UNITED STATES PATENTS

| 563,719 | Patterson | July 7, 1896 |
| 1,491,211 | Taylor | Apr. 22, 1924 |

FOREIGN PATENTS

| 598,130 | Germany | May 17, 1934 |